United States Patent
Takahata et al.

(10) Patent No.: US 9,869,558 B2
(45) Date of Patent: Jan. 16, 2018

(54) MAP DATA STORAGE DEVICE, MAP DATA UPDATING METHOD, AND COMPUTER PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP); DENSO CORPORATION, Kariya-shi, Aichi-ken (JP)

(72) Inventors: Seiji Takahata, Nishio (JP); Kimiyoshi Sawai, Okazaki (JP); Motohiro Nakamura, Okazaki (JP); Tomoki Kodan, Nagoya (JP); Toshio Nomura, Chiryu (JP)

(73) Assignees: AISIN AW CO., LTD., Anjo-shi, Aichi-ken (JP); TOYOTA JIDOSHA KABUSHIKI KAISHA, Toyota-shi, Aichi-ken (JP); DENSO CORPORATION, Kariya-shi, Aichi-ken (JP)

( * ) Notice: Subject to any disclaimer, the term of this patent is extended or adjusted under 35 U.S.C. 154(b) by 34 days.

(21) Appl. No.: 14/786,221

(22) PCT Filed: May 9, 2014

(86) PCT No.: PCT/JP2014/062446
§ 371 (c)(1),
(2) Date: Oct. 22, 2015

(87) PCT Pub. No.: WO2014/181857
PCT Pub. Date: Nov. 13, 2014

(65) Prior Publication Data
US 2016/0061615 A1    Mar. 3, 2016

(30) Foreign Application Priority Data

May 10, 2013    (JP) .................................. 2013-100609

(51) Int. Cl.
*G01C 21/32*    (2006.01)
(52) U.S. Cl.
CPC .................................... *G01C 21/32* (2013.01)
(58) Field of Classification Search
CPC    G01C 21/32; G06F 17/30241; G06F 17/3023
See application file for complete search history.

(56) References Cited

U.S. PATENT DOCUMENTS 5,948,040 A * 9/1999 DeLorme ............... G01C 21/36
340/990
6,230,098 B1 * 5/2001 Ando ..................... G01C 21/32
340/990

(Continued)

FOREIGN PATENT DOCUMENTS

JP    2001-331493 A    11/2001
JP    2007-248580 A    9/2007

(Continued)

OTHER PUBLICATIONS

Communication dated Apr. 7, 2016 from European Patent Office in counterpart Application No. 14794058.9.

(Continued)

*Primary Examiner* — Calvin Cheung
(74) *Attorney, Agent, or Firm* — Sughrue Mion, PLLC

(57) ABSTRACT

A map data storage device, a map data updating method, and a computer program that can shorten the time required for a map data updating process. In the case where map data stored in a navigation-side local DB of a navigation apparatus are to be updated, the navigation apparatus updates the map data stored in the navigation-side local DB on the basis of map updating data received from a map distribution center, and prepares a data reference index that associates a PID (universal identification information) included in the map data with a record number (internal identification information) included in the map data on the basis of the (Continued)

updated map data. After that, in the case where an application is executed by the navigation apparatus, the prepared data reference index is referenced to access the map data stored in the navigation-side local DB.

6 Claims, 12 Drawing Sheets

(56) References Cited

U.S. PATENT DOCUMENTS

| | | | | |
|---|---|---|---|---|
| 6,330,453 | B1* | 12/2001 | Suzuki | G01C 21/32 455/457 |
| 6,453,233 | B1* | 9/2002 | Kato | G01C 21/32 340/995.18 |
| 6,601,073 | B1 | 7/2003 | Robare | |
| 6,636,802 | B1* | 10/2003 | Nakano | G01C 21/32 701/532 |
| 6,960,997 | B2* | 11/2005 | Gieseke | G08G 1/096811 340/539.13 |
| 6,980,907 | B2* | 12/2005 | Umezu | G01C 21/32 701/450 |
| 2001/0004724 | A1* | 6/2001 | Nagaki | G01C 21/32 701/462 |
| 2002/0082773 | A1* | 6/2002 | Ikeuchi | G01C 21/32 701/410 |
| 2004/0133343 | A1* | 7/2004 | Hashida | G01C 21/32 700/208 |
| 2004/0135705 | A1* | 7/2004 | Umezu | G01C 21/32 340/995.14 |
| 2005/0149257 | A1* | 7/2005 | Linkohr | G09B 29/10 701/450 |
| 2006/0106534 | A1* | 5/2006 | Kawamata | G01C 21/32 701/532 |
| 2009/0019095 | A1* | 1/2009 | Asahara | G01C 21/32 |
| 2009/0177706 | A1 | 7/2009 | Takahata et al. | |
| 2010/0138140 | A1 | 6/2010 | Okuyama | |
| 2011/0054770 | A1* | 3/2011 | Allen | G01C 21/36 701/532 |
| 2011/0087425 | A1* | 4/2011 | Deng | G01C 21/32 701/532 |
| 2011/0137546 | A1* | 6/2011 | Roesser | G01C 21/32 701/532 |
| 2011/0153661 | A1* | 6/2011 | Sakai | G01C 21/32 707/770 |
| 2011/0179080 | A1* | 7/2011 | Miyazaki | G06F 17/30241 707/772 |
| 2011/0238305 | A1* | 9/2011 | Tanabe | G01C 21/32 701/532 |
| 2011/0246478 | A1* | 10/2011 | Deng | G01C 21/3679 707/743 |
| 2012/0232733 | A1* | 9/2012 | Herbin | B60Q 1/085 701/22 |
| 2013/0325317 | A1* | 12/2013 | Pylappan | G01C 21/26 701/409 |
| 2014/0278055 | A1* | 9/2014 | Wang | G01C 21/32 701/409 |

FOREIGN PATENT DOCUMENTS

| | | |
|---|---|---|
| JP | 2007-328739 A | 12/2007 |
| JP | 2010-009390 A | 1/2010 |
| WO | 2008/108449 A2 | 9/2008 |

OTHER PUBLICATIONS

International Search Report for PCT/JP2014/062446 dated Aug. 5, 2014.

* cited by examiner

| LINK STRING A | LINK STRING B |
|---|---|
| INTERSECTION PID=1 | INTERSECTION PID=8 |
| LINK ID=10 | LINK ID=26 |
| INTERSECTION PID=2 | INTERSECTION PID=2 |
| LINK ID=12 | LINK ID=28 |
| INTERSECTION PID=3 | INTERSECTION PID=7 |
| LINK ID=14 | |
| INTERSECTION PID=4 | |

FIG. 3

■ INTERSECTION DATA
(ASCENDING ORDER OF INTERSECTION PID)

(RECORD NUMBER)
- #0 INTERSECTION PID=1
- #1 INTERSECTION PID=2
- #2 INTERSECTION PID=3
- #3 INTERSECTION PID=4
- #4 INTERSECTION PID=7
- #5 INTERSECTION PID=8

■ LINK DATA
(ASCENDING ORDER OF LINK ID)

- #0 LINK ID=10, END-POINT INTERSECTION PID=2
- #1 LINK ID=12, END-POINT INTERSECTION PID=3
- #2 LINK ID=14, END-POINT INTERSECTION PID=4
- #3 LINK ID=26, END-POINT INTERSECTION PID=2
- #4 LINK ID=28, END-POINT INTERSECTION PID=7

■ LINK STRING DATA
(ASCENDING ORDER OF LINK ID)

- #0 LINK ID=10, DIFFERENCE ID=5, START POINT-SIDE INTERSECTION PID=1
- #1 LINK ID=26, DIFFERENCE ID=3, START POINT-SIDE INTERSECTION PID=8

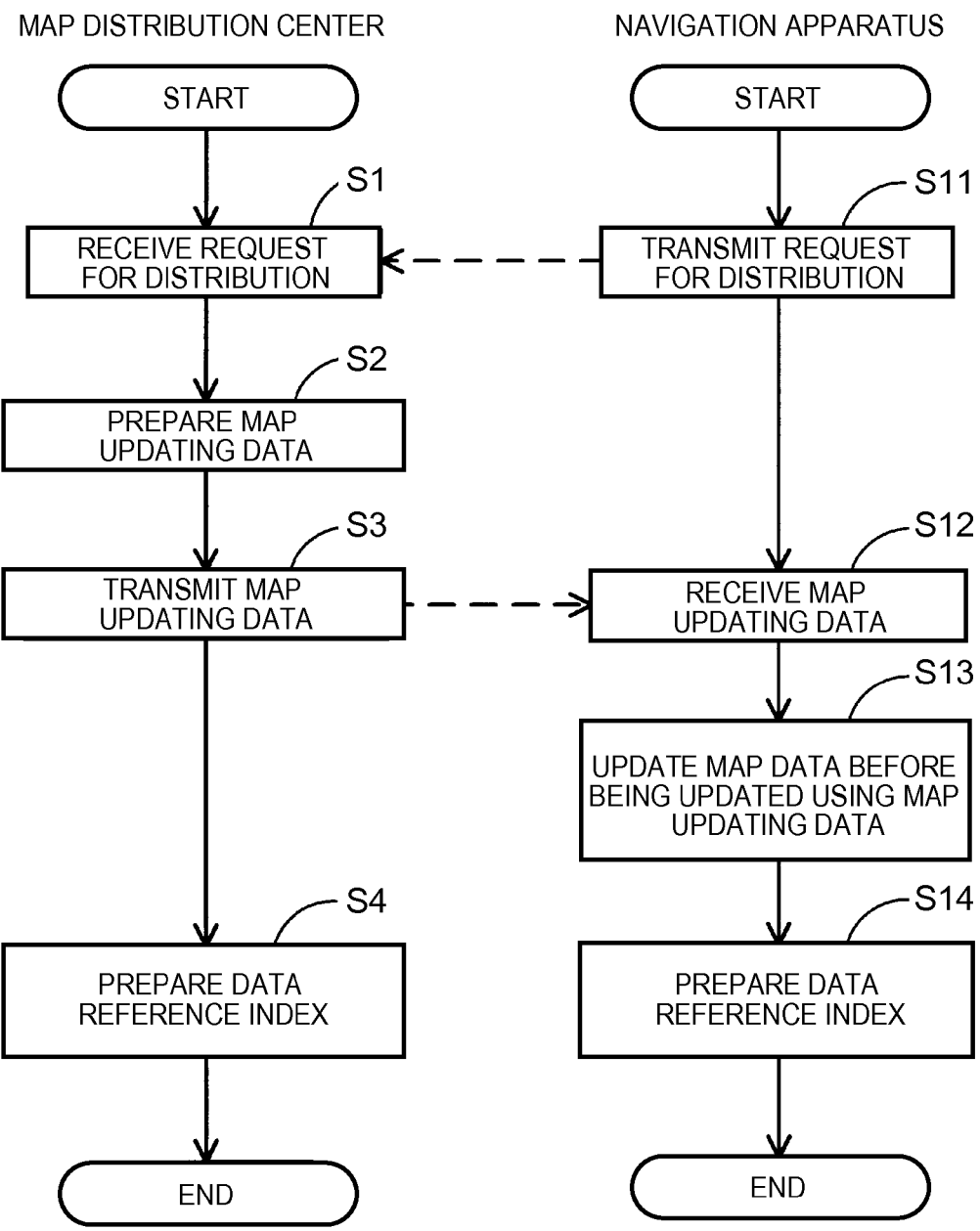

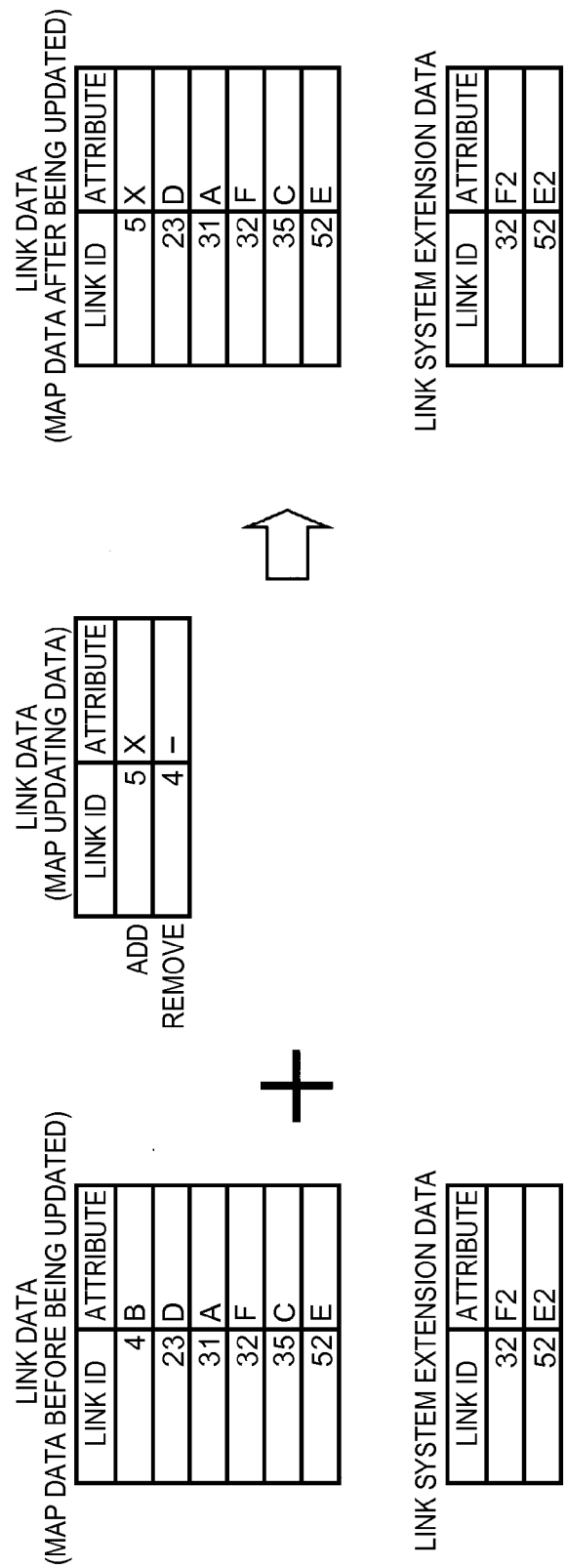

FIG. 11A

| RECORD NUMBER | LINK ID | START-POINT INTERSECTION PID | END-POINT INTERSECTION PID |
|---|---|---|---|
| 0 | 10 | 1 | 2 |
| 1 | 12 | 2 | 3 |
| 2 | 14 | 3 | 4 |
| 3 | 26 | 8 | 2 |
| 4 | 28 | 2 | 7 |

⇩ PREPARE TABLE OF INTERSECTION PID AND LINK RECORD NUMBER

FIG. 11B

| INTERSECTION PID | LINK RECORD NUMBER |
|---|---|
| 1 | (+)0 |
| 2 | (+)1 |
| 3 | (+)2 |
| 8 | (+)3 |
| 2 | (+)4 |
| 2 | (-)0 |
| 3 | (-)1 |
| 4 | (-)2 |
| 2 | (-)3 |
| 7 | (-)4 |

⇩ REARRANGE IN ASCENDING ORDER OF INTERSECTION PID

FIG. 11C

| INTERSECTION PID | LINK RECORD NUMBER |
|---|---|
| 1 | (+)0 |
| 2 | (-)0 |
| 2 | (+)1 |
| 2 | (-)3 |
| 2 | (+)4 |
| 3 | (-)1 |
| 3 | (+)2 |
| 4 | (-)2 |
| 7 | (-)4 |
| 8 | (+)3 |

MAP DATA STORAGE DEVICE, MAP DATA UPDATING METHOD, AND COMPUTER PROGRAM

CROSS REFERENCE TO RELATED APPLICATIONS

This application is a National Stage of International Application No. PCT/JP2014/062446 filed May 9, 2014, claiming priority based on Japanese Patent Application No. 2013-100609, filed May 10, 2013, the contents of all of which are incorporated herein by reference in their entirety.

TECHNICAL FIELD

The present subject matter relates to a map data storage device that stores map data, a map data updating method for updating map data stored in a map data storage device, and a computer program.

BACKGROUND ART

In recent years, many vehicles are provided with a navigation apparatus that provides travel guidance for the vehicle to allow a driver to easily reach a desired destination location. The navigation apparatus is a device that can detect the current position of the vehicle using a GPS receiver or the like and acquire map data corresponding to the current position from a storage medium such as a DVD-ROM or an HDD to display the map data on a liquid crystal monitor. The navigation apparatus reads map data including the current position of the vehicle from the storage medium or the like and depicts an image of a map around the current position of the vehicle on the basis of the map data to display the map image on a display device, displays a vehicle position mark as superposed on the map image, scrolls the map image in accordance with movement of the vehicle, and moves the vehicle position mark with the map image stationary on the screen so that it can be seen at a glance what location the vehicle is currently traveling at. The navigation apparatus also has a route search function for exploring for an optimum route from a departure location (e.g. the current position of the vehicle) to a set destination location when a desired destination location is set, and further has a travel guide function for providing travel guidance along the route found in the search. In recent years, in addition, some cellular phones, PDAs (Personal Digital Assistants), personal computers, and so forth also have functions that are similar to those of the navigation apparatus described above.

New roads (newly constructed roads) are constructed all over Japan every year. Along with that, existing roads are dismantled or changed in shape. In this event, information on the newly constructed roads or the like newly built after the map data of the navigation apparatus or the like are generated is not registered in the map data. That is, in the navigation apparatus or the like which has map data not including the newly constructed roads or the like, the newly constructed roads are not displayed on the liquid crystal monitor, or not used in exploring for a route or providing travel guidance. Therefore, the navigation apparatus or the like may find a roundabout guide route that does not pass through the newly constructed roads or the like. In order to avoid such an inconvenience, it is necessary to update the map data stored in the navigation apparatus or the like at certain time intervals. The map data are updated by purchasing a storage medium for new map data to replace the old storage medium, or rewriting the map data of the navigation apparatus or the like on the basis of map data for update (hereinafter referred to as "map updating data") distributed from a server such as a map information distribution center.

In a method for updating map data stored in a navigation apparatus or the like using map updating data distributed from a server such as a map information distribution center, in particular, in order to reduce the amount of data for communication, difference update in which only a part of information that needs to be updated such as information related to newly constructed roads is updated is performed (see Japanese Patent Application Publication No. 2007-328739 (JP 2007-328739 A) and Japanese Patent Application Publication No. 2010-9390 (JP 2010-9390 A), for example).

RELATED-ART DOCUMENTS

Patent Documents

[Patent Document 1] Japanese Patent Application Publication No. 2007-328739 (JP 2007-328739 A) (pages 13 to 14 and FIG. 1)

[Patent Document 2] Japanese Patent Application Publication No. 2010-9390 (JP 2010-9390 A) (pages 7 to 8 and FIG. 2)

FIG. 12 illustrates an example of a method for updating map data stored in a navigation apparatus according to the related art disclosed in Patent Document 1 mentioned above.

In the example illustrated in FIG. 12, a request for distribution of map updating data for updating map data for an update request area is sent from a navigation apparatus 101 to a map distribution center 102, the version of the update request area of the map data stored in a local DB 103 of the navigation apparatus 101 is "4", and the latest version of the update request area of the map data stored in a local DB 104 of the map distribution center 102 is "5".

In this case, the map distribution center 102 compares map data in version "4" and map data in version "5" stored in the local DB 104 to generate map updating data 105. The map updating data 105 generated in this case are data for updating the map data for the update request area, among the map data stored in the local DB 103 of the navigation apparatus 101, from version "4" to version "5".

Then, the map distribution center 102 distributes the generated map updating data 105 to the navigation apparatus 101 that originated the distribution request. When the map updating data 105 are received, the navigation apparatus 101 updates the map data stored in the local DB 103 using the received map updating data 105. As a result, the map data for the update request area, among the map data stored in the local DB 103 of the navigation apparatus 101, are updated from version "4" to version "5".

However, the map data stored in the local DB 103 are data in a format optimized for update. Specifically, map configuration data (data indicating a network of links and data indicating links connected at intersections) constituting map data are specified using a permanent ID (universal identification information) which is identification information commonly used by the navigation apparatus 101 and the map distribution center 102. Thus, it is inappropriate to use the map data stored in the local DB 103 when the navigation apparatus 101 executes various applications (such as a map display application program, a guide application program, and an search application program, for example). Therefore, data in a reference data format (hereinafter referred to as "reference data") optimized to be referenced when the navigation apparatus 101 executes various applications are separately needed. Thus, after the map data stored in the local DB 103 are updated, the navigation apparatus 101 prepares an application reference DB 106 that stores reference data on the basis of the new map data after being updated.

The application reference DB 106 is prepared by converting the map data stored in the local DB 103. That is, in a map data updating process according to the related art, it is necessary to first update the map data stored in the local DB 103 and thereafter convert the updated map data to prepare the application reference DB 106.

In the related art, the process of converting the map data stored in the local DB 103 to prepare the application reference DB 106 discussed above takes a significantly long processing time. As a result, the map data updating process takes a long time. In order to confirm whether or not the map data have been correctly converted into reference data, in addition, it is necessary to prepare an application reference DB 107 also in the map distribution center 102 and further compare the application reference DB 106 on the navigation apparatus 101 side and the application reference DB 107 on the map distribution center 102 side. Because the application reference DB 106 has a large data size, in addition, a large vacant space is needed in the storage medium in order to store the application reference DB 106 in addition to the local DB 103.

Since the map data updating process takes a long time, in particular, the following issue is caused. That is, the map data updating process is performed when a substantial time elapses after the vehicle makes a request for distribution of map updating data. As a result, the navigation apparatus may become unusable during travel along with update of the map data, which may cause trouble to the user in driving the vehicle.

Patent Document 2 mentioned above discloses that index data to be used when a navigation apparatus executes a particular application (e.g. location search) are separately prepared and the prepared index data are referenced to access map data, which increases the processing speed. However, the technology disclosed in Patent Document 2 is a technology for preparing index data exclusively for increasing the processing speed of a particular application when the application is executed, and the prepared index data can only be used for the corresponding application. However, the access issue due to the use of a permanent ID with the map data discussed above is commonly caused when the navigation apparatus executes any application that involves access to the map data, and cannot be addressed even if index data for increasing only the processing speed of a particular application are prepared.

SUMMARY

The present subject matter has been made to address the foregoing issue of the related art, and therefore has an object to provide a map data storage device, a map data updating method, and a computer program that can shorten the time required for a map data updating process, in which stored map data are updated into new map data, compared to the related art, relieve the processing load on a CPU related to the map data updating process, and reduce the storage capacity for storing the map data.

In order to achieve the foregoing object, the present subject matter provides a map data storage device including: map data storage medium for storing map data; and map data updating code unit for updating the map data stored in the map data storage medium on the basis of map updating data acquired from a server, in which: the map data stored in the map data storage medium include universal identification information which is identification information commonly used by the server and the map data storage device, and internal identification information which is identification information used by a plurality of types of applications executed by the map data storage device; the map data storage device further includes index data preparation code unit for preparing a plurality of types of index data that associate the universal identification information included in the map data with the internal identification information included in the map data in the case where the map data stored in the map data storage medium are updated by the map data updating code unit; the plurality of types of index data correspond to each of the plurality of types of applications; and in the case where an application is executed, the plurality of types of index data corresponding to the executed application are referenced to access the map data stored in the map data storage medium.

The present subject matter also provides a map data updating method for updating map data stored in a map data storage device on the basis of map updating data acquired from a server, wherein the map data stored in the map data storage device include universal identification information which is identification information commonly used by the server and the map data storage device, and internal identification information which is identification information used by a plurality of types of applications executed by the map data storage device; a plurality of types of index data that associate the universal identification information included in the map data with the internal identification information included in the map data are prepared in the case where the map data stored in the map data storage device are updated; the plurality of types of index data correspond to each of the plurality of types of applications; and in the case where the application is executed, the map data storage device references the plurality of types of index data corresponding to the executed application to access the map data stored in the map data storage medium.

The present subject matter further provides a computer program for causing a computer to function as a map updating code unit for updating map data stored in a map data storage medium on the basis of map updating data acquired from a server, wherein: the map data stored in the map data storage medium include universal identification information which is identification information commonly used by the server and the computer, and internal identification information which is identification information used by a plurality of types of applications executed by the computer; a plurality of types of index data that associate the universal identification information included in the map data with the internal identification information included in the map data are prepared in the case where the map data stored in the map data storage medium are updated by the map updating code unit; the plurality of types of index data correspond to each of the plurality of types of applications; and in the case where the application is executed, the plurality of types of index data corresponding to the executed application are referenced to access the map data stored in the map data storage medium.

With the map data storage device, the map data updating method for updating map data stored in a map data storage device on the basis of map updating data acquired from a server, and the computer program for updating map data stored in a map data storage device according to the present subject matter configured as described above, a plurality of types of index data that associate the universal identification information included in the map data with the internal identification information included in the map data are prepared in the case where the map data stored in the map data storage device are updated to new map data; and in the case where the application is executed by the map data storage device thereafter, the plurality of types of index data corresponding to the executed application are referenced to access the stored map data. As a result, the map data can be accessed efficiently even in the case where there is no application reference DB optimized to be referenced when the application is executed, as is the case with the related art. Thus, it is no longer necessary to perform a process for preparing an application reference DB, which can shorten the time required for a map data updating process compared to the related art and relieve the processing load on a CPU. Further, the storage capacity for storing the map data can be reduced.

With the plurality of types of index data corresponding to each application, the map data can be accessed efficiently by referencing the type of index data that is appropriate to each application not only when a particular application is executed but also when various applications are executed.

BRIEF DESCRIPTION OF THE DRAWINGS

FIG. 3 illustrates an example of map data stored in a navigation apparatus or a map distribution center.

FIG. 9 is a flowchart of a map data updating process program according to the embodiment.

FIG. 10 illustrates a process for updating map data stored in the navigation apparatus.

FIGS. 11A to 11C illustrate a process for preparing the data reference index.

A map data storage device, embodied as a navigation apparatus 1, according to an embodiment will be described in detail below with reference to the drawings.

Figure 1:
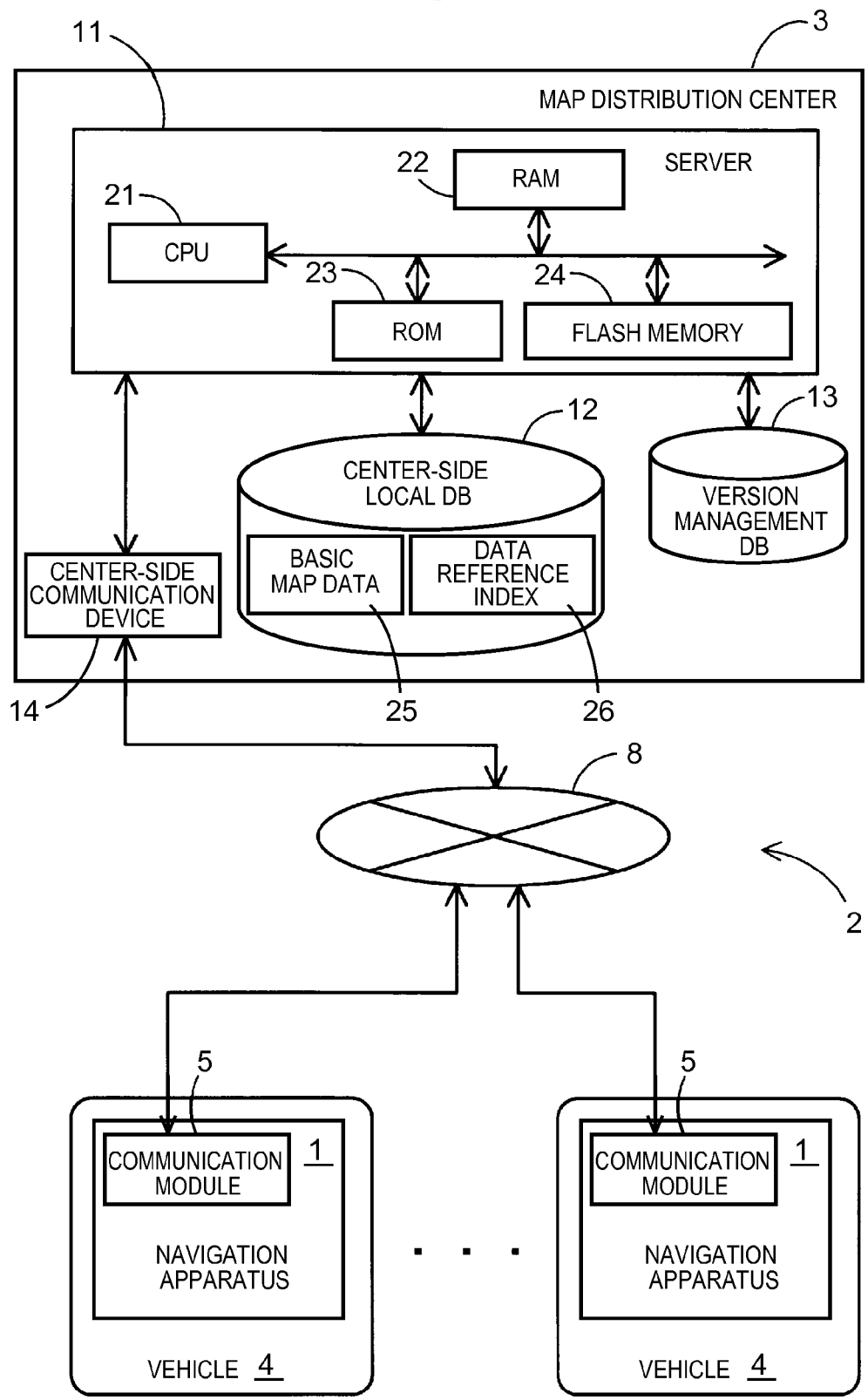
FIG. 1 illustrates a schematic configuration of a map data updating system according to an embodiment.

First, a schematic configuration of a map data updating system 2 including the navigation apparatus 1 according to the embodiment will be described with reference to FIG. 1. FIG. 1 illustrates a schematic configuration of the map data updating system 2 according to the embodiment.

As illustrated in FIG. 1, the map data updating system 2 according to the embodiment is basically composed of a map distribution center 3 and the navigation apparatus 1 installed in a vehicle 4. In the embodiment, the navigation apparatus 1 is used as a terminal that stores map data and that updates the stored map data on the basis of data distributed from the map distribution center 3 as discussed later. However, a cellular phone, a PDA, a personal computer, or the like may be used in place of the navigation apparatus 1.

The map distribution center 3 is a distribution center that generates data (hereinafter referred to as "map updating data") for updating map data in an older version stored in the navigation apparatus 1 to map data in a newer version that reflect roads, facilities, and so forth that have been newly constructed or dismantled, and that distributes the generated map updating data. There are two types of the map updating data, namely full update data for fully rewriting the map data stored in the navigation apparatus 1 for update (hereinafter referred to as "full update") and difference update data for rewriting only a necessary part of the map data for update (hereinafter referred to as "difference update"). In the embodiment described below, in particular, only the difference update data are used as the map updating data.

The navigation apparatus 1 is an in-vehicle device installed in the vehicle 4 which travels on roads all over the country to display a map around the vehicle position on the basis of the stored map data, search for a route to a set destination location, and provide guidance on the route. The map distribution center 3 and the navigation apparatus 1 are configured to be capable of communicating bidirectionally via a network 8 using a communication module 5 for a vehicle (hereinafter referred to simply as a "communication module 5") such as a cellular phone or a DCM installed in the vehicle in advance, and transmit and receive various information such as distribution request data and map updating data to be discussed later between each other.

The navigation apparatus 1 transmits to the map distribution center 3 a request for distribution of map updating data for updating map data for a particular area (e.g. an area within a predetermined distance centered on the home of a user or an area within a predetermined distance centered on a set destination location) to map data in a newer version when a particular condition is met (e.g. when ACC is turned on or when a destination location is set to start providing route guidance).

Further, when map updating data are received from the map distribution center 3 in response to the transmitted request for distribution, the navigation apparatus 1 updates the stored map data on the basis of the received map updating data. The map data updating process will be discussed in detail later.

Subsequently, the map distribution center 3 which constitutes the map data updating system 2 will be described in more detail with reference to FIG. 1.

As illustrated in FIG. 1, the map distribution center 3 includes a server 11, a center-side local DB 12 that serves as an information recording section connected to the server 11, a version management DB 13, and a center-side communication device 14.

The server 11 is a control unit that controls the entire map distribution center 3 for a process for registering new map data that reflect construction and dismantling of roads and facilities all over the country on the basis of an input operation by a manager or the like in the case where such construction and dismantling occurs, a process for preparing map updating data to be distributed to the navigation apparatus 1, a process for distributing the prepared map updating data to the navigation apparatus 1, and so forth. The server 11 includes a CPU 21 that serves as a computation device and a control device that control the entire server 11, and internal storage devices such as a RAM 22 that is used as a working memory when the CPU 21 performs various computation processes, a ROM 23 that stores a control program, a map data updating process program (see FIG. 9) to be discussed later, and so forth, and a flash memory 24 that stores a program read from the ROM 23.

The center-side local DB 12 is storage medium for storing basic map data 25, which are map data that are registered on the basis of input data and an input operation from the outside and that serve as a base when the map data stored in the navigation apparatus 1 are updated, as divided for each version and for each area (e.g. for each secondary mesh). The version is preparation timing information for specifying the timing when the map data were prepared, and the timing when the map data were prepared can be specified by referencing the version. The center-side local DB 12 stores not only the basic map data 25 in the latest version, but also the basic map data 25 in older versions as divided for each version and for each area.

The map data stored in the navigation apparatus 1 and the basic map data 25 have the same configuration, and are composed of various information that is necessary for a route search, route guidance, and map display such as a road network. For example, such data are composed of: map display data for displaying a map; intersection data on intersections; node data on node points; link data on roads (links); link string data indicating a network of roads; search data for exploring for a route; facility data on facilities; search data for searching for a location; and so forth. In addition, the map data stored in the navigation apparatus 1 and the basic map data 25 include a permanent ID (universal identification information, hereinafter referred to as a "PID"), which is identification information commonly used by the map distribution center 3 (server 11) and the navigation apparatus 1, and a record number (internal identification information), which is identification information used by each application executed by the navigation apparatus 1, and have a data format optimized for update. The configuration of the map data stored in the navigation apparatus 1 and the basic map data 25 will be described in more detail below using a specific example.

Figure 2:
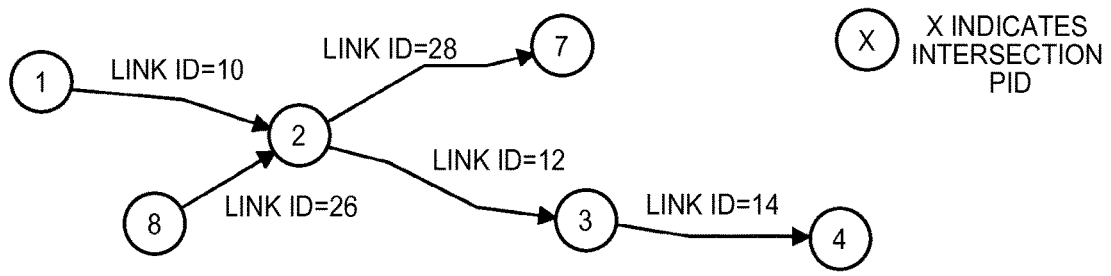
FIG. 2 illustrates an example of a map.

FIG. 3 illustrates, as an example of the map data, map data that specify a plurality of link strings A and B and intersections illustrated in FIG. 2. The link string A illustrated in FIG. 2 is composed of three links (link ID=10, 12, and 14), and the link string B which crosses the link string A is composed of two links (link ID=26 and 28). In addition, six intersections are identified with intersection PID=1, 2, 3, 4, 7, and 8. The link ID is a permanent ID (PID) that identifies a link. The intersection PID is a permanent ID (PID) that identifies an intersection.

In the map data illustrated in FIG. 3, as the intersection data, for example, information that specifies the intersection with PID=1 is first stored in correlation with "record number #0". Specifically, a PID that identifies the intersection with intersection PID=1, that is, intersection PID=1, is stored. Similarly, information that specifies the intersections with PID=2, 3, 4, 7, and 8 is stored in correlation with "record number #1 to #5".

As the link data, meanwhile, information that specifies the link with link ID=10 is first stored in correlation with "record number #0". Specifically, an intersection PID for an end-point intersection (end-point intersection PID=2) is stored together with a PID that identifies the link with link ID=10, that is, link ID=10. Similarly, information that specifies the links with link ID=12, 14, 26, and 28 is stored in correlation with "record number #1 to #4".

As the link string data, meanwhile, information that specifies the link string A is first stored in correlation with "record number #0". Specifically, an intersection PID for a start point-side intersection (start point-side intersection PID=1) is stored together with link IDs that identify links that compose the link string A (links with link ID=10, 12, and 14 are specified by link ID=10 and difference ID=5).

Similarly, information that specifies the link string B is stored in correlation with "record number #1".

Data associated with each record number correspond to the map configuration data, and intersections, links, link strings, and so forth correspond to the constituent elements according to the present subject matter. The map data are updated in the unit of record number. For example, a new record number is added, an existing record number is removed, information associated with a record number is changed, or the like.

The center-side local DB 12 also stores a data reference index 26. The data reference index 26 is data referenced by a navigation ECU to be discussed later in the case where an application is executed by the navigation apparatus 1 as discussed later. The same data reference index 26 is also stored in the navigation apparatus 1 as discussed later. The data reference index 26 is data that associate the PID (universal identification information) included in the map data with the record number (internal identification information) also included in the map data. The data reference index 26 is prepared by the server 11 and the navigation ECU to be discussed later each time the map data are updated on the basis of the map data stored in the navigation apparatus 1 and the basic map data 25. The configuration of the data reference index 26 stored in the navigation apparatus 1 and the map distribution center 3 will be described in more detail below using a specific example.

Figure 4:
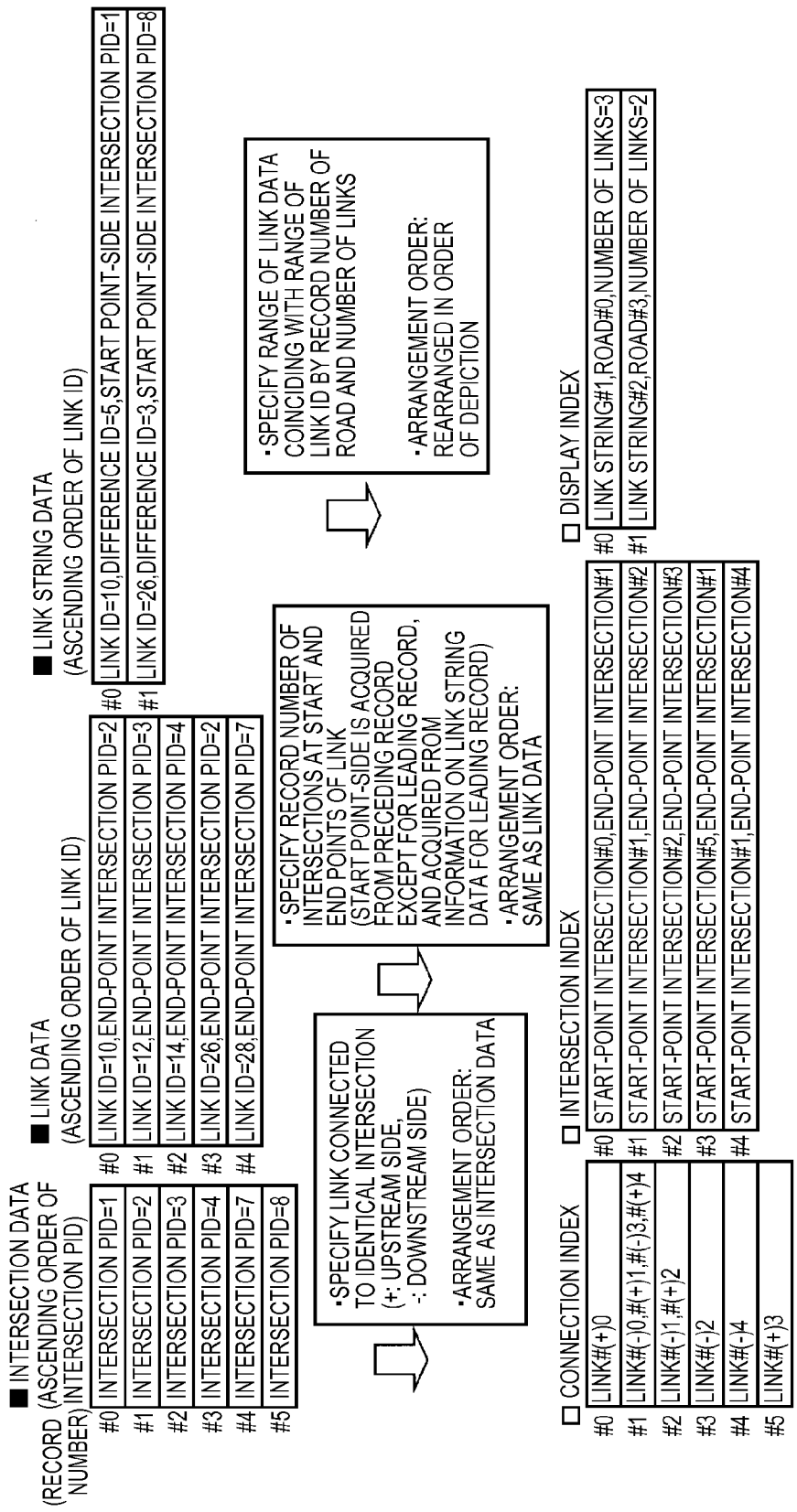
FIG. 4 illustrates an example of a data reference index prepared on the basis of the map data.

FIG. 4 illustrates, as an example of the data reference index 26, the data reference index 26 prepared on the basis of the map data illustrated in FIG. 3.

As the data reference index 26 illustrated in FIG. 4, there are provided: a connection index referenced to specify the relationship of connection between links when executing the search application program, the guide application program, or the like; an intersection index referenced to specify an intersection to which a link is connected when executing the search application program, the guide application program, the map display application program, or the like; and a display index referenced to specify a link string when executing the map display application program or the like.

For example, the connection index illustrated in FIG. 4 specifies a link connected to an identical intersection for each intersection by the record number on the basis of the intersection. For example, it is indicated that a link specified by "record number #0" (that is, the link with link ID=10) is connected to the upstream side of an intersection specified by "record number #0" (that is, the intersection with intersection PID=1). Similarly, a link connected to each of intersections specified by "record number #1 to #5" (that is, the intersections with intersection PID=2, 3, 4, 7, and 8) is also indicated by the record number.

Meanwhile, the intersection index specifies start-point and end-point intersections of each link by the record number on the basis of the link. For example, it is indicated that a link specified by "record number #0" (that is, the link with link ID=10) has an intersection specified by "record number #1" (that is, the intersection with intersection PID=2) as the start point and an intersection specified by "record number #2" (that is, the intersection with intersection PID=3) as the end point. Similarly, start-point and end-point intersections are also indicated for each of links specified by "record number #1 to #4" (that is, the links with link ID=12, 14, 26, and 28) by the record number.

Meanwhile, the display index specifies a start-point link for each link string by the record number and also specifies the number of links that compose the link string on the basis of the link string. For example, it is indicated that a link string specified by "record number #0" (that is, the link string A) has a link specified by "record number #0" (that is, the link with link ID=10) as the start point and is composed of three links that are continuous toward the upstream side. Similarly, the start-point link is indicated by the record number and the number of links that compose the link string are also indicated for a link string specified by "record number #1" (that is, the link string B).

That is, the data reference index 26 is data that associate the PID (universal identification information) included in the map configuration data with the record number (internal identification information) for each of a plurality of map configuration data constituting the map data. Thus, the navigation apparatus 1 can reference the data reference index in the case where an application is executed to specify and access map configuration data that need to be accessed, among the map configuration data constituting the map data, by the record number and not via the PID as discussed later.

The version management DB 13 is storage medium for storing the version of the map data currently stored in each navigation apparatus 1 to which map updating data are to be distributed.

The center-side communication device 14 is a communication device that communicates with the navigation apparatus 1 via the network 8. Examples of the network 8 include communication systems such as communication line networks such as a LAN (Local Area Network), a WAN (Wide Area Network), an intranet, a cellular phone line network, a telephone line network, a public communication line network, a private communication line network, and the Internet. Additional examples include communication systems that utilize CS broadcasting and BS broadcasting that use broadcasting satellites, digital terrestrial television broadcasting, and FM multiplex broadcasting. Further examples include communication systems such as the Electronic Toll Collection (ETC) system utilized in the Intelligent Transport System (ITS) and the Dedicated Short Range Communication (DSRC) system.

After a request for distribution of map updating data is received from the navigation apparatus 1, the map distribution center 3 references the version management DB 13 to generate map updating data to be distributed to the navigation apparatus 1 that originated the distribution request. After that, the generated map updating data are distributed.

Figure 5:
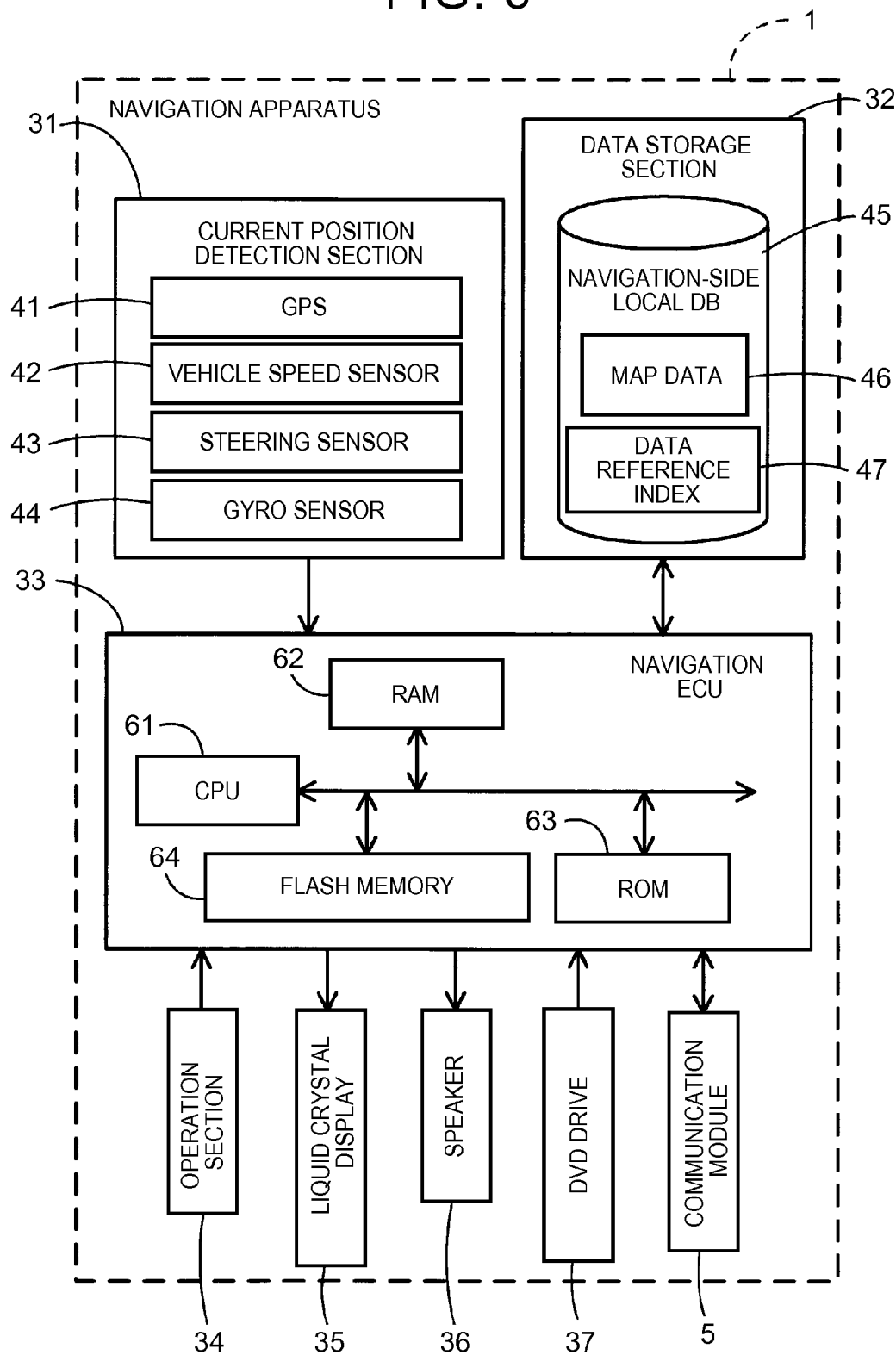
FIG. 5 is a block diagram schematically illustrating a control system of the navigation apparatus according to the embodiment.

Next, a schematic configuration of the navigation apparatus 1 mounted on the vehicle 4 will be described with reference to FIG. 5. FIG. 5 is a block diagram schematically illustrating a control system of the navigation apparatus 1 according to the embodiment.

As illustrated in FIG. 5, the navigation apparatus 1 according to the embodiment is composed of: a current position detection section 31 that detects the current position of the vehicle on which the navigation apparatus 1 is mounted; a data storage section 32 that stores various data; a navigation ECU 33 that performs various computation processes on the basis of input information; an operation section 34 that receives an operation from the user; a liquid crystal display 35 that displays a map and a guide route to the destination location to the user; a speaker 36 that outputs audio route guidance; a DVD drive 37 that reads a DVD that serves as a storage medium that stores a program; and the communication module 5 which communicates with the map distribution center 3, a VICS (registered trademark) center, and so forth.

The constituent elements of the navigation apparatus 1 will be described below in order.

The current position detection section 31 is composed of a GPS 41, a vehicle speed sensor 42, a steering sensor 43, a gyro sensor 44, and so forth, and can detect the current position of the vehicle, the orientation, the travel speed of the vehicle, the current time, and so forth. In particular, the vehicle speed sensor 42 is a sensor for detecting the travel distance of the vehicle and the vehicle speed, and generates pulses in accordance with rotation of the drive wheels of the vehicle to output a pulse signal to the navigation ECU 33. The navigation ECU 33 counts the generated pulses to calculate the rotational speed of the drive wheels and the travel distance. It is not necessary that the navigation apparatus 1 should include all of the four sensors, and the navigation apparatus 1 may be configured to include only one or some of such sensors.

The data storage section 32 includes a hard disk (not illustrated) that serves as an external storage device and a storage medium, and a recording head (not illustrated) that serves as a driver that reads a predetermined program etc. from a navigation-side local DB 45 stored in the hard disk and writes predetermined data into the hard disk. The data storage section 32 may be constituted of a memory card in place of the hard disk.

The navigation-side local DB 45 is storage medium for storing map data 46 used by the navigation apparatus 1 to explore for a route or provide guidance. The navigation-side local DB 45 also stores a data reference index 47 prepared on the basis of the map data 46 stored in the navigation-side local DB 45.

As with the basic map data 25 described above, the map data 46 stored in the navigation-side local DB 45 are composed of various information that is necessary for a route search, route guidance, and map display such as a road network. For example, such data are composed of: map display data for displaying a map; intersection data on intersections; node data on node points; link data on roads (links); link string data indicating a network of roads; search data for exploring for a route; facility data on facilities; search data for searching for a location; and so forth. In addition, the map data 46 include a PID (universal identification information), which is identification information commonly used by the map distribution center 3 (server 11) and the navigation apparatus 1, and a record number (internal identification information), which is identification information used by each application executed by the navigation apparatus 1, and have a data format optimized for update. The map data 46 have already been described in detail with reference to FIG. 3, and thus will not be described.

The data reference index 47 stored in the navigation-side local DB 45 is data referenced by the navigation ECU 33 in the case where an application is executed by the navigation apparatus 1, and is similar in configuration to the data reference index 26 stored in the map distribution center 3 described above. The data reference index 47 has already been described in detail with reference to FIG. 4, and thus will not be described.

Next, access to the navigation-side local DB 45 made when the navigation apparatus 1 according to the embodiment performs various applications will be described with reference to FIG. 6.

Figure 6:
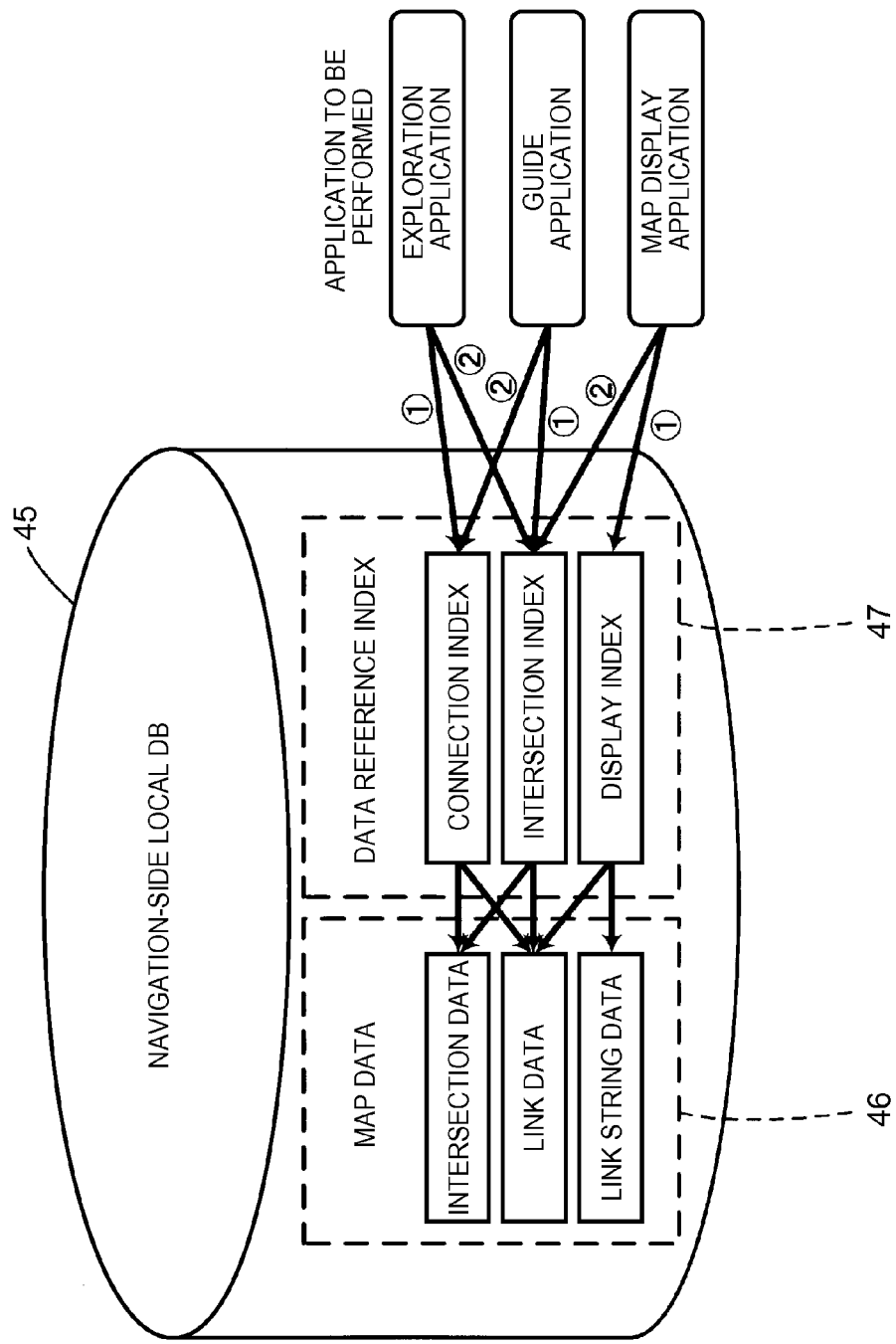
FIG. 6 illustrates access to a navigation-side local DB made when various applications are performed by the navigation apparatus.

In the example illustrated in FIG. 6, the intersection data, the link data, and the link string data illustrated in FIG. 3, in particular, are used as examples of the map data 46 stored in the navigation-side local DB 45. In addition, the connection index, the intersection index, and the display index illustrated in FIG. 4, in particular, are used as examples of the data reference index 47.

Figure 12:
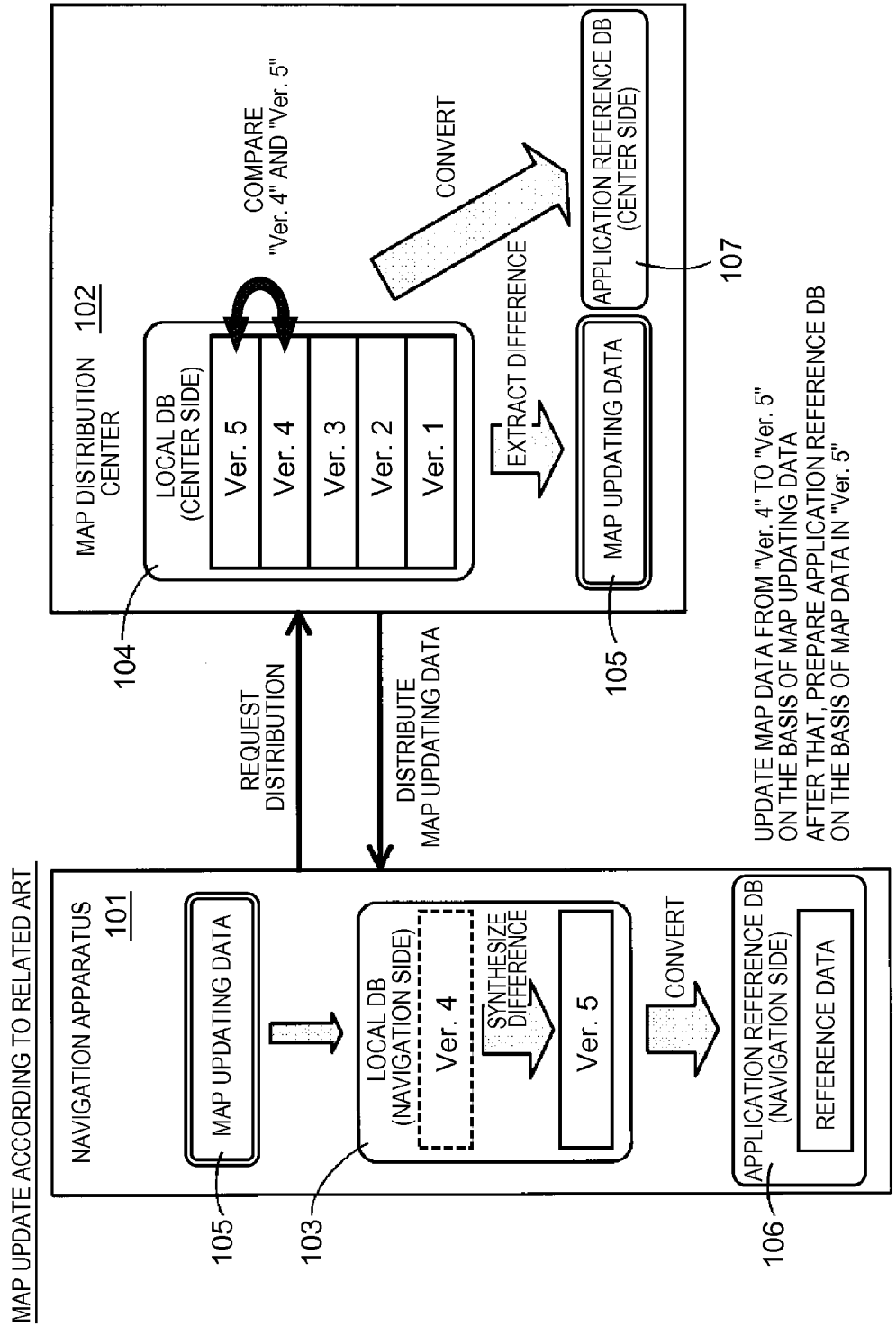
FIG. 12 illustrates a method for updating map data according to the related art.

For example, when the navigation ECU 33 executes the search application program in the navigation apparatus 1, the connection index which specifies the relationship of connection between links and the intersection index referenced to specify an intersection to which a link is connected are referenced to access the intersection data and the link data of the map data 46. In the embodiment, in particular, reference is made using the connection index, among the connection index and the intersection index, as the origin point (that is, reference is sequentially made to the connection index, then to the intersection index, then to the connection index, then to the intersection index, . . . ). As a result, the processing speed can be increased. The data reference index 47 is data that associate the PID (universal identification information) included in the map configuration data with the record number (internal identification information) for each of the plurality of map configuration data constituting the map data 46. Thus, the navigation ECU 33 can reference the data reference index 47 in the case where an application is executed to specify and access map configuration data that need to be accessed, among the map configuration data constituting the map data 46, by the record number and not via the PID. As a result, the map data 46 can be accessed efficiently when executing the search application program even in the case where there is no application reference DB (see FIG. 12) optimized to be referenced when various application programs are executed, as is the case with the related art.

When the navigation ECU 33 executes the guide application program in the navigation apparatus 1, meanwhile, the connection index which specifies the relationship of connection between links and the intersection index referenced to specify an intersection to which a link is connected are referenced to access the intersection data and the link data of the map data 46. In the embodiment, in particular, reference is made using the intersection index, among the connection index and the intersection index, as the origin point (that is, reference is sequentially made to the intersection index, then to the connection index, then to the intersection index, then to the connection index, . . . ). Thus, the map data 46 can be accessed efficiently also when executing the guide application program.

When the navigation ECU 33 executes the map display application program in the navigation apparatus 1, meanwhile, the intersection index referenced to specify an intersection to which a link is connected and the display index referenced to specify a link string are referenced to access the link data and the link string data of the map data 46. In the embodiment, in particular, reference is made using the display index, among the intersection index and the display index, as the origin point (that is, reference is sequentially made to the display index, then to the intersection index, then to the display index, then to the intersection index, . . . ). Thus, the map data 46 can be accessed efficiently also when executing the map display application program.

The map data 46 stored in the navigation-side local DB 45 are updated to map data in a newer version by rewriting a relevant part of data with new data on the basis of the map updating data distributed from the map distribution center 3. When the map data 46 are updated, in addition, a new data reference index 47 is prepared on the basis of the updated map data 46. A specific process for updating the map data 46 and a process for preparing the data reference index 47 will be described in detail later with reference to a flowchart.

Figure 7:
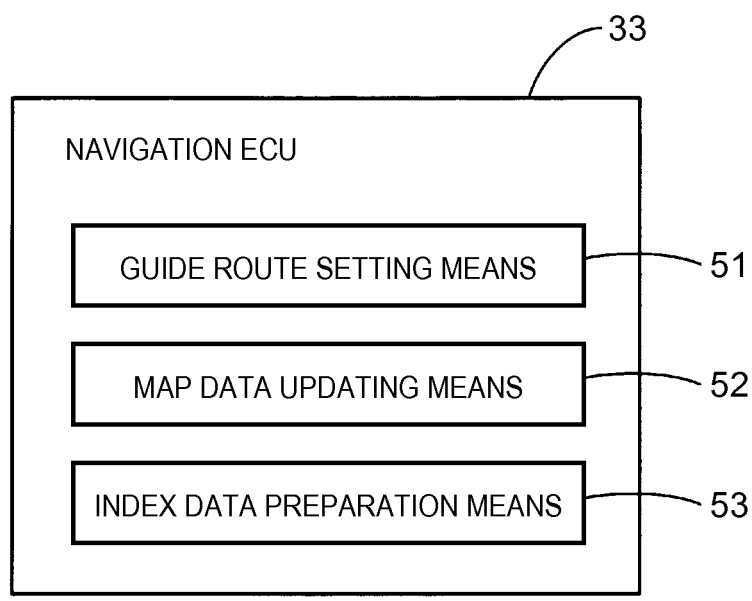
FIG. 7 illustrates the configuration of a navigation ECU.

As illustrated in FIG. 7, the navigation ECU (electronic control unit) 33 is an electronic control unit that controls the entire navigation apparatus 1, and is composed of: guide route setting code unit 51 for setting a guide route from a departure location to a destination location in the case where the destination location is selected; map data updating code unit 52 for updating the map data 46 stored in the navigation-side local DB 45 on the basis of the map updating data distributed from the map distribution center 3 (server 11); index data preparation code unit 53 for preparing the data reference index 47 which associates the PID (universal identification information) such as link ID and intersection PID included in the map data 46 with the record number (internal identification information) included in the map data 46 in the case where the map data 46 stored in the navigation-side local DB 45 are updated by the map data updating code unit; and so forth. The navigation ECU 33 also includes a CPU 61 that serves as a computation device and a control device, and internal storage devices such as a RAM 62 that is used as a working memory when the CPU 61 performs various computation processes and that stores route data when a route is found, a ROM 63 that stores a control program, a map data updating process program (see FIG. 9) to be discussed later, and so forth, and a flash memory 64 that stores a program read from the ROM 63.

The operation section 34 is operated to input a departure location at which travel is started and a destination location at which travel is ended, and composed of a plurality of operation switches (not illustrated) such as various keys and buttons. The navigation ECU 33 performs control so as to execute various operations on the basis of a switch signal output in response to a depression of a switch or the like. The operation section 34 may be composed of a touch panel provided on the front surface of the liquid crystal display 35.

The liquid crystal display 35 displays a map image including roads, traffic information, operational guidance, an operation menu, key guidance, an expected travel route from a departure location to a destination location, guidance information on a travel along the expected travel route, news, weather forecasts, the time, mails, television programs, and so forth. The liquid crystal display 35 is also used to display information related to a facility found when a facility search is made.

The speaker 36 outputs audio guidance on a travel along an expected travel route and guidance on traffic information on the basis of an instruction from the navigation ECU 33. The speaker 36 is also used to output information related to a facility found when a facility search is made.

The DVD drive 37 is a drive that can read data stored in a storage medium such as a DVD and a CD.

The communication module 5 is a communication device that receives center traffic information and VICS information transmitted from the map distribution center 3, the VICS center, and so forth, and may be a cellular phone or a DCM, for example.

Figure 8:
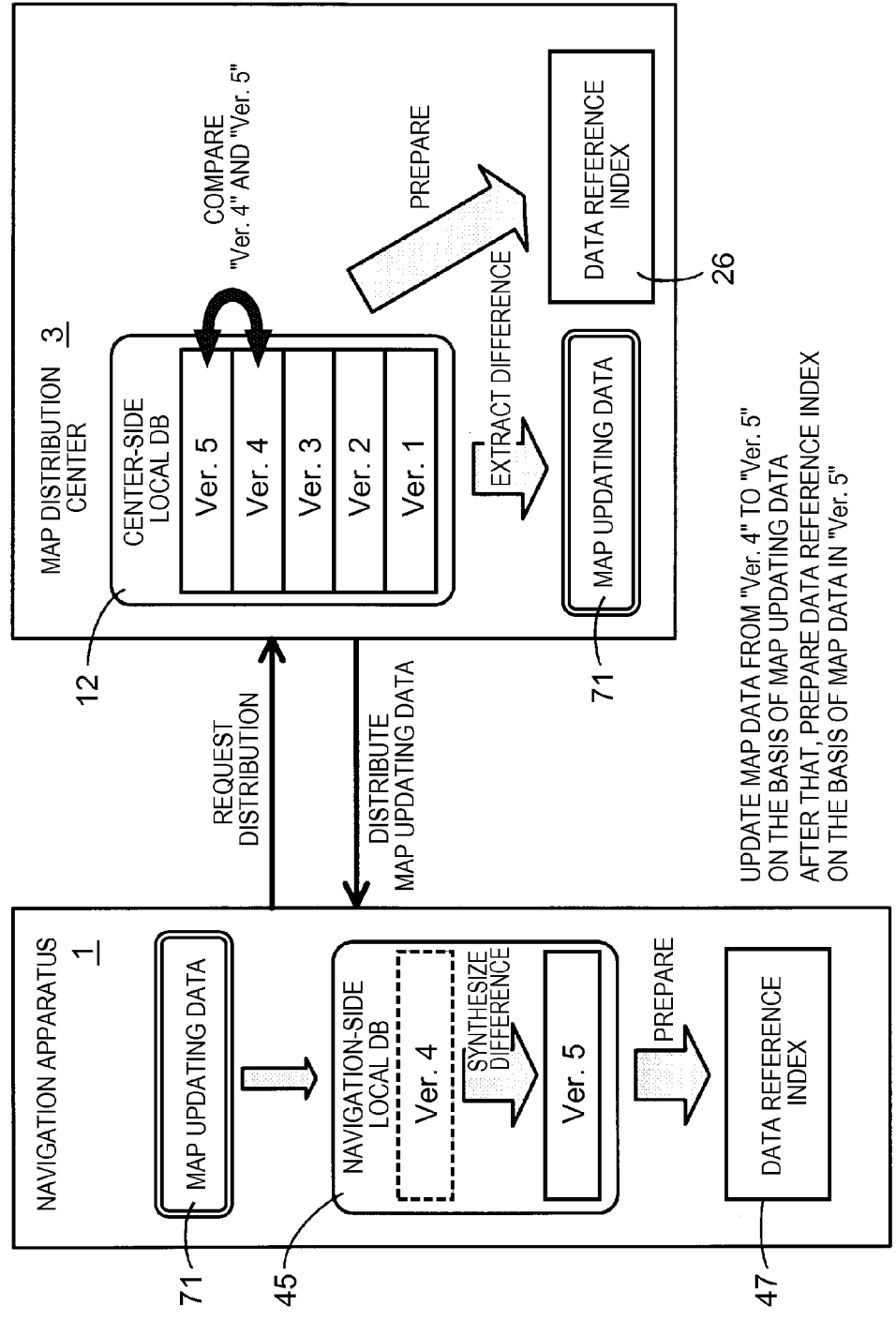
FIG. 8 illustrates a process for updating map data stored in the navigation apparatus.

Next, a process for updating the map data 46 stored in the navigation apparatus 1 configured as described above will be described briefly with reference to FIG. 8. In the example illustrated in FIG. 8, a request for distribution of map updating data for updating map data for an update request area is sent from the navigation apparatus 1 to the map distribution center 3, the version of the update request area of the map data 46 stored in the navigation-side local DB 45 of the navigation apparatus 1 is "4", and the latest version of the update request area of the basic map data 25 stored in the map distribution center 3 is "5".

In this case, the map distribution center 3 compares the basic map data 25 in version "4" and the basic map data in version "5" stored in the center-side local DB 12 to generate map updating data 71. When preparing the map updating data, in addition, a process for checking an error in the prepared map updating data is also performed. The map updating data 71 generated in this case are data for updating the map data for the update request area, among the map data 46 stored in the navigation-side local DB 45 of the navigation apparatus 1, from version "4" to version "5".

Then, the map distribution center 3 distributes the generated map updating data 71 to the navigation apparatus 1 that originated the distribution request. When the map updating data 71 are received, the navigation apparatus 1 updates the map data 46 stored in the navigation-side local DB 45 using the received map updating data 71. As a result, the map data 46 for the update request area, among the map data 46 stored in the navigation-side local DB 45 of the navigation apparatus 1, are updated from version "4" to version "5". When the map data 46 stored in the navigation-side local DB 45 are updated, the navigation apparatus 1 prepares a data reference index 47 on the basis of the updated map data 46. Also in the map distribution center 3, a data reference index 26 is prepared on the basis of the basic map data 25.

Subsequently, a map data updating process program executed by the server 11 of the map distribution center 3 and the navigation ECU 33 of the navigation apparatus 1 in the map data updating system 2 configured as described above will be described with reference to FIG. 9. FIG. 9 is a flowchart of the map data updating process program according to the embodiment. The map data updating process program is a program executed at the timing when a request for distribution of map updating data is transmitted from the navigation apparatus 1 to the map distribution center 3 (specifically, when ACC is turned on, when a destination location is set to start providing route guidance, or the like) to update the map data 46 stored in the navigation-side local DB 45 on the basis of the map updating data distributed from the map distribution center 3. The program illustrated in the flowchart of FIG. 9 described below is stored in the RAM or the ROM of the navigation apparatus 1 or the map distribution center 3, and executed by the CPU 21 or the CPU 61.

First, the map data updating process program executed by the CPU 21 of the map distribution center 3 will be described with reference to FIG. 9. First, in step (hereinafter abbreviated as "S") 1, the CPU 21 receives a request for distribution of map updating data transmitted from the navigation apparatus 1.

The request for distribution includes a user ID that specifies the navigation apparatus 1 as the sender of the request for distribution, and information that specifies the area for which update is requested. The navigation apparatus 1 is configured to request the map distribution center 3 to distribute map updating data when ACC is turned on or when a destination location is set to start providing route guidance, for example. When ACC of the navigation apparatus 1 is turned on, the area for which update is requested is within a predetermined area including a registered location such as the home of the navigation apparatus 1, for example. When a destination location is set on the navigation apparatus 1 to start providing route guidance, meanwhile, the area for which update is requested is within a predetermined area including the destination location set on the navigation apparatus 1.

Next, in S2, the CPU 21 generates map updating data for updating the map data 46 stored in the navigation-side local DB 45 of the navigation apparatus 1 as the sender of the request for distribution. Specifically, the CPU 21 first acquires the version of the update target area of the map data 46 stored in the navigation-side local DB 45 of the navigation apparatus 1 as the sender of the request for distribution from the version management DB 13. Then, the CPU 21 compares the basic map data 25 in the acquired version and the basic map data 25 in the latest version for the same area to generate map updating data. The map updating data generated in this case are data for updating the map data 46 for the update target area in the update request area, among the map data 46 stored in the navigation-side local DB 45 of the navigation apparatus 1, from the current version to a newer version (see FIG. 8).

Subsequently, in S3, the CPU 21 distributes the map updating data prepared in S2 to the navigation apparatus 1 as the sender of the request for distribution. The map updating data may be distributed via the network 8 described above, or via a storage medium such as a memory card, a DVD, and a CD. Alternatively, the map updating data may be distributed with the server 11 and the navigation apparatus 1 directly connected to each other through a cable or the like.

Then, the navigation apparatus 1 which has received the map updating data updates the map data 46 stored in the navigation-side local DB 45 on the basis of the received map updating data as discussed later.

After that, in S4, the CPU 21 newly prepares a data reference index 26 (FIG. 4) on the basis of the basic map data 25 stored in the center-side local DB 12. The data reference index 26 has already been described in detail, and thus will not be described.

Next, the map data updating process program executed by the CPU 61 of the navigation apparatus 1 will be described. First, in S11, the CPU 61 transmits a request for distribution of map updating data to the map distribution center 3.

Subsequently, in S12, the CPU 61 receives map updating data distributed from the map distribution center 3 in response to the transmission of the request for distribution. The received map updating data are temporarily stored in the data storage section 32 or the like.

After that, in S13, the CPU 61 updates the map data 46 stored in the navigation-side local DB 45 to the map data 46 in a newer version by rewriting a relevant part of the map data 46 with a new data content on the basis of the map updating data received in S12.

The map data updating system 2 according to the embodiment provides tying between link data included in the map data 46 stored in the navigation-side local DB 45 and link system extension data is performed by the link ID which is the PID, not by the record number. Thus, in the embodiment, in contrast to a case where tying between the link data and the link system extension data is performed by the record number, the record number is not depleted, or it is not necessary to newly correct the link system extension data in accordance with the link data after being updated.

For example, FIG. 10 illustrates an example of update of the map data 46 stored in the navigation-side local DB 45. As illustrated in FIG. 10, in the case where map updating data for adding a link with link ID=5 and removing a link with link ID=4 are received from the map distribution center 3 as the map updating data, link data on the link with link ID=4 are removed from the map data 46, and link data on a link with link ID=5 are added instead. In this way, the map data 46 stored in the navigation-side local DB 45 are updated to the map data 46 in a newer version. In this event, tying between the link data and the link system extension data is performing by the link ID, and thus it is not necessary to correct the link system extension data.

After that, in S14, the CPU 61 newly prepares a data reference index 47 (FIG. 4) on the basis of the updated map data 46 stored in the navigation-side local DB 45.

A process for preparing the data reference index 47 in S14 will be described below using a specific example. FIG. 11 illustrates an example of a case of preparing a connection index referenced to specify the relationship of connection between links on the basis of the map data 46 in the case where the map data 46 illustrated in FIG. 3 are stored in the navigation-side local DB 45, in particular.

FIG. 11A: first, the CPU 61 prepares a table in which the intersection PID of the start-point intersection and the intersection PID of the end-point intersection are associated with each other for each link on the basis of the link data and the intersection data of the map data 46.

FIG. 11B: after that, the CPU 61 prepares a table in which the intersection PID and the record number corresponding to each link (e.g. the link with link ID=10 has a record number #0) are associated with each other. (+) indicates the record number corresponding to the link connected to the upstream side of the intersection. (−) indicates the record number corresponding to the link connected to the downstream side of the intersection.

FIG. 11C: subsequently, pieces of the data in the prepared table are rearranged in the ascending order of the intersection PID.

As a result of performing the processes in FIGS. 11A to 11C, the connection index illustrated in FIG. 4 is prepared. Similarly, the other data reference indices 47 such as the intersection index and the display index are also prepared, and stored in the navigation-side local DB 45.

Then, when various applications are performed by the navigation apparatus 1, the CPU 61 accesses the map data 46 stored in the navigation-side local DB 45 using the data reference index 47 prepared in S14 as illustrated in FIG. 6. As a result, the map data 46 can be accessed efficiently when executing various applications. In the case where a plurality of data reference indices 47 correspond to one application, the data reference index 47 referenced as the origin point in the case where the application is executed is also set. For example, when the guide application program is executed, reference is made using the intersection index, among the connection index and the intersection index, as the origin point (that is, reference is sequentially made to the intersection index, then to the connection index, then to the intersection index, then to the connection index, . . . ). In this way, it is possible to access map data more efficiently even in the case where it is necessary to reference a plurality of data reference indices 47.

With the navigation apparatus 1, the map data updating method for updating map data stored in the navigation apparatus 1, and the computer program executed by the navigation apparatus 1 according to the embodiment, as described in detail above, in the case where the map data 46 stored in the navigation-side local DB 45 of the navigation apparatus 1 are to be updated, the navigation apparatus 1 transmits a request for distribution to the map distribution center 3 (S11), receives map updating data prepared by the map distribution center 3 which has received the request for distribution (S12), and updates the map data 46 stored in the navigation-side local DB 45 on the basis of the received map updating data (S13). Further, the navigation apparatus 1 prepares a data reference index 47 that associates a PID (universal identification information) included in the map data 46 with a record number (internal identification information) included in the map data 46 on the basis of the updated map data 46 (S14), and in the case where an application is executed by the navigation apparatus 1 thereafter, the prepared data reference index 47 is referenced to access the map data 46 stored in the navigation-side local DB 45. Thus, the map data 46 can be accessed efficiently even in the case where there is no application reference DB optimized to be referenced when the application is executed, as is the case with the related art. Thus, it is no longer necessary to perform a process for preparing an application reference DB, which can shorten the time required for a process for updating the map data 46 stored in the navigation-side local DB 45 compared to the related art and relieve the processing load on a CPU. Further, the storage capacity for storing the map data 46 can be reduced.

By preparing the data reference index 47 with the plurality of types of data reference indices 47 corresponding to each application, in addition, the map data can be accessed efficiently by referencing the type of data reference indices 47 that is appropriate to each application not only when a particular application is executed but also when various applications are executed.

In addition, a plurality of types of data reference indices 47 are prepared on the basis of the intersection, the link, and the link string. Thus, the map data can be accessed efficiently for each application when executing various applications that need different information such as travel guidance and location search.

In addition, the data reference index 47 referenced as the origin point in the case where the application is executed is set. Thus, the map data can be accessed more efficiently even in the case where it is necessary to reference a plurality of data reference indices 47.

In addition, the map data 46 are composed of a plurality of pieces of map configuration data in which a relationship between a plurality of constituent elements is specified by the PID; the plurality of pieces of map configuration data are stored in the data storage section 32 in correlation with different record numbers; and the data reference index 47 is data that associate the PID included in the map configuration data with the record number for each of the plurality of pieces of map configuration data. Thus, it is possible to specify and access map configuration data that need to be accessed, among the map configuration data constituting the map data 46, by the record number and not via the PID. As a result, the map data 46 can be accessed efficiently even in the case where there is no application reference DB optimized to be referenced when the application is executed such as that according to the related art.

In addition, one or a plurality of the data reference indices 47 correspond to one or a plurality of the applications executed by the navigation apparatus 1. Thus, an appropriate data reference index 47 can be associated in consideration of map data that need to be accessed for each application. As a result, the map data 46 can be accessed efficiently by referencing the associated data reference index 47 when the application is executed by the navigation apparatus 1.

It should be understood that the present subject matter is not limited to the embodiment described above, and that various improvements and modifications may be made without departing from the scope and spirit of the present subject matter.

For example, in the embodiment, not only the navigation apparatus 1 but also the map distribution center 3 prepares the data reference index 26 on the basis of the map data. However, only the navigation apparatus 1 may prepare the data reference index 26 on the basis of the map data. In addition, the navigation apparatus 1 may not prepare the data reference index 47, and the data reference index 26 prepared by the map distribution center 3 may be distributed to the navigation apparatus 1 together with the map updating data.

In the embodiment, in addition, the data reference index 47 prepared by the navigation apparatus 1 is stored in the navigation-side local DB 45. However, the data reference index 47 prepared by the navigation apparatus 1 may be stored in another DB.

In the embodiment, in addition, the navigation apparatus 1 is used as a terminal that stores map data and that updates the stored map data on the basis of data distributed from the map distribution center 3. However, a cellular phone, a smartphone, a PDA, a tablet terminal, a personal computer, or the like may be used in place of the navigation apparatus 1.

While a map data storage device according to a specific embodiment has been described above, the map data storage device may be configured as described below, and the following effect can be achieved in such cases.

For example, a first configuration is as follows.

A map data storage device including: map data storage medium for storing map data; and map data updating code unit for updating the map data stored in the map data storage medium on the basis of map updating data acquired from a server, in which: the map data stored in the map data storage medium include universal identification information which is identification information commonly used by the server and the map data storage device, and internal identification information which is identification information used by a plurality of types of applications executed by the map data storage device; the map data storage device further comprises index data preparation code unit for preparing a plurality of types of index data that associate the universal identification information included in the map data with the internal identification information included in the map data in the case where the map data stored in the map data storage medium are updated by the map data updating code unit; and in the case where the application is executed, the plurality of types of index data corresponding to the executed application are referenced to access the map data stored in the map data storage medium.

With the map data storage device configured as described above, a plurality of types of index data that associate the universal identification information included in the map data with the internal identification information included in the map data are prepared in the case where the map data stored in the map data storage device are updated to new map data; and in the case where the application is executed by the map data storage device thereafter, the plurality of types of index data corresponding to the executed application are referenced to access the stored map data. As a result, the map data can be accessed efficiently even in the case where there is no application reference DB optimized to be referenced when the application is executed, as is the case with the related art. Thus, it is no longer necessary to perform a process for preparing an application reference DB, which can shorten the time required for a map data updating process compared to the related art and relieve the processing load on a CPU. Further, the storage capacity for storing the map data can be reduced.

With the plurality of types of index data corresponding to each application, the map data can be accessed efficiently by referencing the type of index data that is appropriate to each application not only when a particular application is executed but also when various applications are executed.

A second configuration is as follows.

The index data includes: connection index data for specifying a link connected to an intersection on the basis of the intersection; and intersection index data for specifying intersections positioned at a start point and an end point of a link on the basis of the link.

With the map data storage device configured as described above, a plurality of types of index data are prepared on the basis of the intersection and the link. Thus, the map data can be accessed efficiently for each application when executing various applications that need different information such as travel guidance and location search.

A third configuration is as follows.

The index data further includes display index data for specifying a link included in a link string on the basis of the link string.

With the map data storage device configured as described above, index data are prepared further on the basis of the link string. Thus, the map data can be accessed efficiently when executing an application that needs information on the link string.

A fourth configuration is as follows.

The index data referenced as an origin point is set from the plurality of types of index data corresponding to each application.

With the map data storage device configured as described above, index data referenced as the origin point in the case where the application is executed are set. Thus, the map data can be accessed more efficiently even in the case where it is necessary to reference a plurality of index data.

A fifth configuration is as follows.

The map data includes a plurality of pieces of map configuration data in which a relationship between a plurality of constituent elements is specified by the universal identification information; the plurality of pieces of map configuration data are stored in the map data storage medium in correlation with different pieces of the internal identification information; and the index data are data that associate the universal identification information included in the map configuration data with the internal identification information for each of the plurality of pieces of map configuration data.

With the map data storage device configured as described above, map configuration data that need to be accessed, among the map configuration data constituting the map data, can be specified and accessed by the internal identification information, not via the universal identification information. As a result, the map data can be accessed efficiently even in the case where there is no application reference DB optimized to be referenced when the application is executed, as is the case with the related art.

A sixth configuration is as follows.

One or a plurality of the index data are corresponds to one or a plurality of the applications.

With the map data storage device configured as described above, the plurality of types of index data correspond to each application executed by the map data storage device. Thus, appropriate index data can be associated in consideration of map data that need to be accessed for each application. As a result, the map data can be accessed efficiently by referencing the associated index data when executing the application.

DESCRIPTION OF THE REFERENCE NUMERALS

1 NAVIGATION APPARATUS
2 MAP DATA UPDATING SYSTEM
3 MAP DISTRIBUTION CENTER
4 VEHICLE
11 SERVER
21 CPU
22 RAM
23 ROM
32 DATA STORAGE SECTION
33 NAVIGATION ECU
61 CPU
62 RAM
63 ROM
45 NAVIGATION-SIDE LOCAL DB
46 MAP DATA
47 DATA REFERENCE INDEX

The invention claimed is:

1. A map data navigation and storage device comprising:
a GPS receiver to determine a position of the navigation and storage device;
map data storage medium for storing map data; and
map data updating code unit for updating the map data stored in the map data storage medium on the basis of map updating data acquired from a server, wherein:
the map data stored in the map data storage medium include universal identification information which is identification information commonly used by the server and the map data storage device, and internal identification information which is identification information used by a plurality of types of applications executed by the map data storage device;
the map data storage device further comprises index data preparation code unit for preparing a plurality of types of index data that associate the universal identification information included in the map data with the internal identification information included in the map data in the case where the map data stored in the map data storage medium are updated by the map data updating code unit; and
in the case where an application is executed, the plurality of types of index data corresponding to the executed application are referenced to access the map data stored in the map data storage medium, wherein
the index data include:
connection index data for specifying a link connected to an intersection on the basis of the intersection;
intersection index data for specifying intersections positioned at a start point and an end point of a link on the basis of the link; and
display index data for specifying a link included in a link string on the basis of the link string,
wherein a route for travel is determined using the position determined by GPS receiver and the index data.

2. The map data navigation and storage device according to claim 1, wherein
the index data referenced as an origin point is set from the plurality of types of index data corresponding to each application by setting the origin point for defining an order to reference the map data for each application.

3. The map data navigation and storage device according to claim 1, wherein:
the map data are composed of a plurality of pieces of map configuration data in which a relationship between a plurality of constituent elements is specified by the universal identification information;
the plurality of pieces of map configuration data are stored in the map data storage medium in correlation with different pieces of the internal identification information; and
the index data are data that associate the universal identification information included in the map configuration data with the internal identification information for each of the plurality of pieces of map configuration data.

4. The map data navigation and storage device according to claim 1, wherein
the plurality of types of index data correspond to each of the plurality of types of applications.

5. A map data updating and navigating method for updating map data stored in a map data storage and navigation device on the basis of map updating data acquired from a server and navigating based on the updated data, wherein:
a position of the map data storage and navigation device is determined using a GPS receiver;
the map data stored in the map data storage device include universal identification information which is identification information commonly used by the server and the map data storage device, and internal identification information which is identification information used by a plurality of types of applications executed by the map data storage device;
a plurality of types of index data that associate the universal identification information included in the map data with the internal identification information included in the map data are prepared in the case where the map data stored in the map data storage device are updated;
the plurality of types of index data correspond to each of the plurality of types of applications; and
in the case where an application is executed, the map data storage device references the plurality of types of index data corresponding to the executed application to access the map data stored in the map data storage device, wherein
the index data include:
connection index data for specifying a link connected to an intersection on the basis of the intersection;
intersection index data for specifying intersections positioned at a start point and an end point of a link on the basis of the link;
display index data for specifying a link included in a link string on the basis of the link string; and
a route for travel is determined using the position determined by GPS receiver and the index data.

6. A non-transitory computer readable storage medium storing instructions that is executable by a computer program for causing a computer to function as map updating code unit for updating map data stored in a map data storage medium on the basis of map updating data acquired from a server and for providing navigation, wherein:
a position of the computer is determined using a GPS receiver;
the map data stored in the map data storage medium include universal identification information which is identification information commonly used by the server and the computer, and internal identification information which is identification information used by a plurality of types of applications executed by the computer;

a plurality of types of index data that associate the universal identification information included in the map data with the internal identification information included in the map data are prepared in the case where the map data stored in the map data storage medium are updated by the map updating code unit;

the plurality of types of index data correspond to each of the plurality of types of applications; and in the case where an application is executed, the plurality of types of index data corresponding to the executed application are referenced to access the map data stored in the map data storage medium, wherein the index data include:

connection index data for specifying a link connected to an intersection on the basis of the intersection;

intersection index data for specifying intersections positioned at a start point and an end point of a link on the basis of the link; and display index data for specifying a link included in a link string on the basis of the link string; and a route for travel is determined using the position determined by GPS receiver and the index data.

\* \* \* \* \*